United States Patent
Gabriel et al.

(10) Patent No.: US 10,655,013 B2
(45) Date of Patent: May 19, 2020

(54) BLOW-MOLDABLE POLYAMIDE COMPOSITIONS

(71) Applicant: BASF SE, Ludwigshafen (DE)

(72) Inventors: Claus Gabriel, Griesheim (DE); Manoranjan Prusty, Mannheim (DE); Martin Baumert, Singapore (SG); Norbert Güntherberg, Speyer (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 16/259,408

(22) Filed: Jan. 28, 2019

(65) Prior Publication Data
US 2019/0153223 A1    May 23, 2019

Related U.S. Application Data

(63) Continuation of application No. 14/359,355, filed as application No. PCT/EP2012/072531 on Nov. 14, 2012, now abandoned.

(30) Foreign Application Priority Data

Nov. 25, 2011  (EP) .................................. 11190751

(51) Int. Cl.
| | | |
|---|---|---|
| C08L 77/06 | (2006.01) |
| C08L 77/00 | (2006.01) |
| C08K 3/08 | (2006.01) |
| C08K 3/16 | (2006.01) |
| C08K 3/32 | (2006.01) |
| C08L 23/08 | (2006.01) |
| C08L 25/08 | (2006.01) |
| C08L 25/16 | (2006.01) |
| C08L 35/06 | (2006.01) |
| C08L 79/02 | (2006.01) |

(52) U.S. Cl.
CPC ............... *C08L 77/06* (2013.01); *C08K 3/08* (2013.01); *C08K 3/16* (2013.01); *C08K 3/32* (2013.01); *C08L 23/08* (2013.01); *C08L 23/0846* (2013.01); *C08L 25/08* (2013.01); *C08L 25/16* (2013.01); *C08L 35/06* (2013.01); *C08L 77/00* (2013.01); *C08L 79/02* (2013.01)

(58) Field of Classification Search
CPC .................................. C08L 77/00; C08L 77/06
See application file for complete search history.

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,510,777 A | 6/1950 | Gray |
| 2,512,606 A | 6/1950 | Bolton et al. |
| 2,640,044 A | 5/1953 | Stamatoff |
| 2,705,227 A | 3/1955 | Stamatoff |
| 3,393,210 A | 7/1968 | Speck |
| 3,691,131 A | 9/1972 | Kelmchuk et al. |
| 4,537,949 A | 8/1985 | Schmidt et al. |

(Continued)

FOREIGN PATENT DOCUMENTS

| | | |
|---|---|---|
| CA | 1323953 C | 11/1993 |
| DE | 2204495 A1 | 8/1972 |

(Continued)

OTHER PUBLICATIONS

CAS Record for SMA-3000, Sep. 30, 2015. (Year: 2015).*

(Continued)

*Primary Examiner* — Christopher M Rodd
(74) *Attorney, Agent, or Firm* — Marshall, Gerstein & Borun LLP

(57) ABSTRACT

Thermoplastic molding compositions comprising
A) from 10 to 99.7% by weight of a polyamide,
B) from 1 to 30% by weight of an impact modifier,
C) from 0.1 to 10% by weight of a copolymer of
   $C_1$) from 50 to 95% by weight of styrene or substituted styrenes of the general formula I or a mixture of these

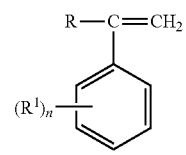

I in which R is an alkyl radical having from 1 to 8 carbon atoms or a hydrogen atom and $R^1$ is an alkyl radical having from 1 to 8 carbon atoms and n has the value 0, 1, 2, or 3, and
   $C_2$) from 5 to 50% by weight of structural units derived from one or more dicarboxylic anhydrides,
D) from 0.001 to 20% by weight of iron powder,
E) from 0.05 to 3% by weight of a copper-containing stabilizer,
F) from 100 ppm to 5% by weight of a phosphorus-containing, inorganic acid or salts thereof or ester derivatives thereof or a mixture thereof,
G) from 0 to 2% by weight of a polyethyleneimine homo- or copolymer,
H) from 0 to 60% by weight of further additives,
where the total of the percentages by weight of A) to H) is 100%.

19 Claims, No Drawings

(56) References Cited

U.S. PATENT DOCUMENTS

| | | | |
|---|---|---|---|
| 4,540,772 A | 9/1985 | Pipper et al. | |
| 4,966,941 A | 10/1990 | Subramanian | |
| 5,061,757 A * | 10/1991 | Warner | C08L 77/00 525/179 |
| 5,122,570 A * | 6/1992 | Subramanian | C08L 77/00 525/179 |
| 5,846,478 A | 12/1998 | Onishi et al. | |
| 6,194,538 B1 | 2/2001 | Weiss et al. | |
| 6,699,960 B1 | 3/2004 | Ohlbach et al. | |
| 6,737,462 B2 * | 5/2004 | Gittinger | C08K 3/16 524/401 |
| 2006/0235191 A1 | 10/2006 | Deininger et al. | |
| 2008/0146718 A1 | 6/2008 | Gijsman et al. | |
| 2009/0012229 A1 | 1/2009 | Desbois et al. | |
| 2012/0004353 A1 * | 1/2012 | Prusty | C08L 77/00 524/236 |
| 2012/0208937 A1 | 8/2012 | Prusty et al. | |
| 2012/0214904 A1 | 8/2012 | Prusty et al. | |

FOREIGN PATENT DOCUMENTS

| | | |
|---|---|---|
| DE | 2602449 A1 | 7/1977 |
| DE | 10042176 A1 | 9/2001 |
| DE | 10313681 A1 | 10/2004 |
| EP | 38094 A2 | 10/1981 |
| EP | 38582 A2 | 10/1981 |
| EP | 39524 A1 | 11/1981 |
| EP | 129195 A2 | 12/1984 |
| EP | 129196 A2 | 12/1984 |
| EP | 295906 A1 | 12/1988 |
| EP | 299444 A2 | 1/1989 |
| EP | 922065 A2 | 6/1999 |
| EP | 1198491 A1 | 4/2002 |
| EP | 1994075 A2 | 11/2008 |
| JP | H09221590 A | 8/1997 |
| JP | 2000086889 A | 3/2000 |
| JP | 2000256123 A | 9/2000 |
| WO | WO-9520011 A1 | 7/1995 |
| WO | WO-2005007727 A1 | 1/2005 |
| WO | WO-2006074912 A1 | 7/2006 |
| WO | WO-2010076145 A1 | 7/2010 |
| WO | WO-2011051121 A1 | 5/2011 |
| WO | WO-2011051123 A1 | 5/2011 |

OTHER PUBLICATIONS

CAS Record for SMA-3000 Sep. 30, 2015.
"Heat Stabilizers", Plastics Additives and Compounding, pp. 24-29, Aug./Sep. 1999.
English translation of patent reference JPH09221590, which was submitted with applicant's initial Information Disclosure Statement, filed Aug. 19, 2014.
International Search Report in international patent application No. PCT/EP2012/072531, dated Feb. 5, 2013.

* cited by examiner

BLOW-MOLDABLE POLYAMIDE COMPOSITIONS

CROSS-REFERENCE TO RELATED APPLICATIONS

This is a Continuation of U.S. application Ser. No. 14/359,355, filed May 20, 2014, which is the U.S. national phase application of International Application No. PCT/EP2012/072531, filed Nov. 14, 2012, which claims the benefit of European Patent Application No. 11190751.5, filed Nov. 25, 2011.

The invention relates to thermoplastic molding compositions comprising
A) from 10 to 99.7% by weight of a polyamide,
B) from 1 to 30% by weight of an impact modifier,
C) from 0.1 to 10% by weight of a copolymer of
  $C_1$) from 50 to 95% by weight of styrene or substituted styrenes of the general formula I or a mixture of these

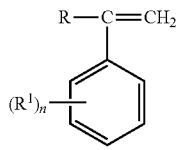

in which R is an alkyl radical having from 1 to 8 carbon atoms or a hydrogen atom and $R^1$ is an alkyl radical having from 1 to 8 carbon atoms and n has the value 0, 1, 2, or 3, and
  $C_2$) from 5 to 50% by weight of structural units derived from one or more dicarboxylic anhydrides,
D) from 0.001 to 20% by weight of iron powder,
E) from 0.05 to 3% by weight of a copper-containing stabilizer,
F) from 100 ppm to 5% by weight of a phosphorus-containing, inorganic acid or salts thereof or ester derivatives thereof or a mixture thereof,
G) from 0 to 2% by weight of a polyethyleneimine homo- or copolymer,
H) from 0 to 60% by weight of further additives,
where the total of the percentages by weight of A) to H) is 100%.

The present invention further relates to the use of molding compositions of this type for producing moldings of any type and to the moldings thus obtainable, preferably interior parts of any type for motor vehicles.

Thermoplastic polyamides, such as PA6 and PA66, are often used in the form of glassfiber-reinforced molding compositions as structural materials for components which during their lifetime have exposure to elevated temperatures, and this results in thermooxidative degradation phenomena. Addition of known heat stabilizers can delay the occurrence of the thermooxidative degradation but cannot prevent it in the long term, and an example of this is seen in deterioration of mechanical properties. It is highly desirable to improve the resistance of polyamides to heat-aging (HAR), so this can give lifetimes for components subject to thermal stress or can reduce their risk of failure. As an alternative, improved HAR can also permit the use of the components at higher temperatures.

The use of elemental iron powder in polyamides is known from DE-A 26 02 449, JP-A 09/221590, JP-A 2000/86889 (in each case as filler), JP-A 2000/256 123 (as decorative addition), and WO 2006/074912, and WO 2005/007727 (stabilizers).

WO 2011/051123, WO 2011/051121 and WO 2010/076145 disclose further combinations of specific iron powders with other stabilizers.

The surface of the moldings is not entirely satisfactory since the heat-aging process produces porosity and causes blistering.

The abovementioned additives lead to molecule weight reduction, which facilitates processing by injection molding.

The known molding compositions are not suitable for producing blow moldings since in particular melt stability is inadequate.

Blow-moldable polyamide molding compositions have been disclosed in U.S. Pat. No. 4,966,941, EP-A 295 906, CA 1,323,953, and DE-A 10042176.

However, HAR and melt stability are unsatisfactory.

It was therefore an object of the present invention to provide thermoplastic, blow-moldable polyamide molding compositions which have improved HAR and good surface after heat aging, and also good mechanical properties. A particular intention was to improve melt stability during blow molding and to improve the surface of blow moldings.

The expression "melt stability" means not only melt strength but also thermal stability (molar mass alteration over defined periods).

Accordingly, the molding compositions defined in the introduction have been discovered. Preferred embodiments can be found in the dependent claims.

The molding compositions of the invention comprise, as component A), from 10 to 99.7% by weight, preferably from 20 to 99.5% by weight, and in particular from 30 to 94% by weight, very particularly preferably from 30 to 88% by weight, of at least one polyamide.

The intrinsic viscosity of the polyamides of the molding compositions of the invention is generally from 90 to 350 ml/g, preferably from 110 to 240 ml/g, determined in 0.5% by weight solution in 96% by weight sulfuric acid at 25° C. in accordance with ISO 307. Particular preference is given to polyamides with IV greater than 150 ml/g, preferably greater than 165 ml/g.

Preference is given to semicrystalline or amorphous resins with a molecular weight (weight average) of at least 5000, for example those described in the following U.S. Pat. Nos. 2,071,250, 2,071,251, 2,130,523, 2,130,948, 2,241,322, 2,312,966, 2,512,606 and 3,393,210.

Examples of these are polyamides which derive from lactams having from 7 to 13 ring members, e.g. polycaprolactam, polycaprylolactam and polylaurolactam, and also polyamides obtained via reaction of dicarboxylic acids with diamines.

Dicarboxylic acids which may be used are alkanedicarboxylic acids having from 6 to 12, in particular from 6 to 10, carbon atoms, and aromatic dicarboxylic acids. Acids which may be mentioned here merely as examples are adipic acid, azelaic acid, sebacic acid, dodecanedioic acid and terephthalic and/or isophthalic acid.

Particularly suitable diamines are alkanediamines having from 6 to 12, in particular from 6 to 8, carbon atoms, and also m-xylylenediamine (e.g. Ultramid® X17 from BASF SE, 1:1 molar ratio of MXDA to adipic acid), di(4-aminophenyl)methane, di(4-aminocyclohexyl)methane, 2,2-di(4-aminophenyl)propane, 2,2-di(4-aminocyclohexyl)propane or 1,5-diamino-2-methylpentane.

Preferred polyamides are polyhexamethyleneadipamide, polyhexamethylenesebacamide and polycaprolactam, and also nylon-6/6,6 copolyamides, in particular having a proportion of from 5 to 95% by weight of caprolactam units (e.g. Ultramid® C33 from BASF SE).

Other suitable polyamides are obtainable from ω-aminoalkyl nitriles, e.g. aminocapronitrile (PA 6) and adiponitrile with hexamethylenediamine (PA 66) via what is known as direct polymerization in the presence of water, for example as described in DE-A 10313681, EP-A 1198491 and EP 922065.

Mention may also be made of polyamides obtainable, by way of example, via condensation of 1,4-diaminobutane with adipic acid at an elevated temperature (nylon-4,6). Preparation processes for polyamides of this structure are described by way of example in EP-A 38 094, EP-A 38 582, and EP-A 39 524.

Other suitable materials are polyamides obtainable via copolymerization of two or more of the abovementioned monomers, and mixtures of two or more polyamides in any desired mixing ratio. Particular preference is given to mixtures of nylon-6,6 with other polyamides, and in particular to nylon-6/6,6 copolyamides.

Other polyamides which have proven particularly advantageous are semiaromatic copolyamides, such as PA 6/6T and PA 66/6T, where the triamine content of these is less than 0.5% by weight, preferably less than 0.3% by weight (see EP-A 299 444). EP-A 19 94 075 discloses other polyamides resistant to high temperature (PA 6T/6I/MXD6).

The processes described in EP-A 129 195 and 129 196 can be used to prepare the preferred semiaromatic copolyamides with low triamine content.

The following list, which is not comprehensive, comprises the polyamides A) mentioned and other polyamides A) for the purposes of the invention, and the monomers comprised.

AB polymers:

| | |
|---|---|
| PA 4 | Pyrrolidone |
| PA 6 | ε-Caprolactam |
| PA 7 | Ethanolactam |
| PA 8 | Caprylolactam |
| PA 9 | 9-Aminopelargonic acid |
| PA 11 | 11-Aminoundecanoic acid |
| PA 12 | Laurolactam |

AA/BB polymers:

| | |
|---|---|
| PA 46 | Tetramethylenediamine, adipic acid |
| PA 66 | Hexamethylenediamine, adipic acid |
| PA 69 | Hexamethylenediamine, azelaic acid |
| PA 610 | Hexamethylenediamine, sebacic acid |
| PA 612 | Hexamethylenediamine, decanedicarboxylic acid |
| PA 613 | Hexamethylenediamine, undecanedicarboxylic acid |
| PA 1212 | 1,12-Dodecanediamine, decanedicarboxylic acid |
| PA 1313 | 1,13-Diaminotridecane, undecanedicarboxylic acid |
| PA 6T | Hexamethylenediamine, terephthalic acid |
| PA 9T | 1,9-Nonanediamine, terephthalic acid |
| PA MXD6 | m-Xylylenediamine, adipic acid |

AA/BB polymers:

| | |
|---|---|
| PA 6I | Hexamethylenediamine, isophthalic acid |
| PA 6-3-T | Trimethylhexamethylenediamine, terephthalic acid |
| PA 6/6T | (see PA 6 and PA 6T) |
| PA 6/66 | (see PA 6 and PA 66) |
| PA 6/12 | (see PA 6 and PA 12) |
| PA 66/6/610 | (see PA 66, PA 6 and PA 610) |
| PA 6I/6T | (see PA 6I and PA 6T) |
| PA PACM 12 | Diaminodicyclohexylmethane, laurolactam |
| PA 6I/6T/PACM | As PA 6I/6T + diaminodicyclohexylmethane |
| PA 12/MACMI | Laurolactam, dimethyldiaminodicyclohexylmethane, isophthalic acid |
| PA 12/MACMT | Laurolactam, dimethyldiaminodicyclohexylmethane, terephthalic acid |
| PA PDA-T | Phenylenediamine, terephthalic acid |

The molding compositions of the invention comprise, as component B), from 1 to 30% by weight, preferably from 5 to 25% by weight, and in particular from 10 to 25% by weight, of an impact modifier (often also termed rubber, or elastomeric polymer).

Preference is given by way of example to a copolymer I composed of $B_1$) from 35 to 89.9% by weight of ethylene $B_2$) from 10 to 60% by weight of 1-octene or 1-butene or propylene or a mixture of these and $B_3$) from 0.05 to 5% by weight of functional monomers, where the functional monomers have been selected from the group of the carboxylic acid groups, carboxylic anhydride groups, carboxylic ester groups, carboxamide groups, carboximide groups, amino groups, hydroxy groups, epoxy groups, urethane groups and oxazoline groups and mixtures of these, or a copolymer II of $B_1$) from 50 to 98% by weight of ethylene $B_4$) from 2 to 50% by weight of acrylic acid or methacrylic acid or (meth)acrylate having from 1 to 18 carbon atoms, or $B_5$) from 0 to 20% by weight of functional monomers selected from the group of the carboxylic anhydride groups and epoxy groups and mixtures of these, or a mixture of these.

The proportion of the functional groups $B_3$) is from 0.05 to 5% by weight, preferably from 0.2 to 4% by weight, and in particular from 0.3 to 3.5% by weight, based on 100% by weight of B).

Particularly preferred components $B_3$) are composed of an ethylenically unsaturated mono- or dicarboxylic acid or of a functional derivative of this type of acid.

Suitable compounds are in principle any of the primary, secondary, and tertiary $C_1$-$C_{18}$-alkyl esters of acrylic acid or methacrylic acid, but preference is given to esters having from 1 to 12 carbon atoms, in particular having from 2 to 10 carbon atoms.

Examples here are methyl, ethyl, propyl, n-butyl, isobutyl, tert-butyl, 2-ethylhexyl, octyl, and decyl acrylates and the corresponding methacrylates. Among these, n-butyl acrylate and 2-ethylhexyl acrylate are particularly preferred.

It is also possible that the olefin polymers comprise, instead of the esters or in addition thereto, acid-functional and/or latent acid-functional monomers of ethylenically unsaturated mono- or dicarboxylic acids, or monomers having epoxy groups.

Other examples that may be mentioned of monomers $B_3$) are acrylic acid, methacrylic acid, tertiary alkyl esters of these acids, in particular tert-butyl acrylate, and dicarboxylic acids, such as maleic acid and fumaric acid, and derivatives of these acids, and also monoesters thereof.

The expression "latent acid-functional monomers" means compounds which form free acid groups under the conditions of polymerization or during incorporation of the olefin polymers into the molding compositions. Examples that may be mentioned of these are anhydrides of dicarboxylic acids having up to 20 carbon atoms, in particular maleic anhydride, and tertiary $C_1$-$C_{12}$-alkyl esters of the abovementioned acids, in particular tert-butyl acrylate and tert-butyl methacrylate.

The acid-functional or latent acid-functional monomers and the monomers comprising epoxy groups are preferably incorporated into the olefin polymers via addition of compounds of the general formulae I-IV to the monomer mixture.

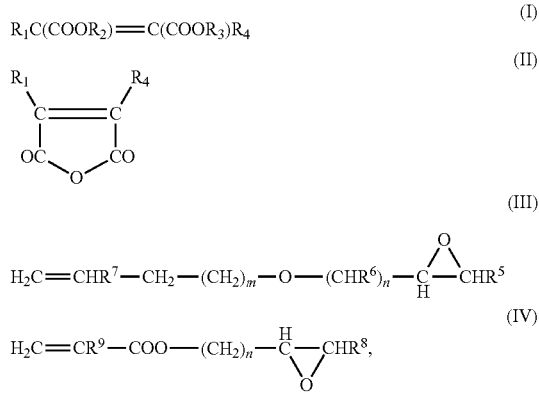

where the radicals $R^1$-$R^9$ are hydrogen or alkyl groups having from 1 to 6 carbon atoms and m is an integer from 0 to 20 and n is an integer from 0 to 10.

Hydrogen is preferred for $R^1$-$R^7$, the value 0 or 1 is preferred for m, and the value 1 is preferred for n. The corresponding compounds are maleic acid, fumaric acid, maleic anhydride and, respectively, alkenyl glycidyl ether or vinyl glycidyl ether.

Preferred compounds of the formulae I, II, III and IV are maleic acid and maleic anhydride as component $B_3$) and epoxidized esters of acrylic acid and/or methacrylic acid, particular preference being given to glycidyl acrylate and glycidyl methacrylate (as component $B_3$).

Particular preference is given to olefin polymers I of from 50 to 89.8% by weight of ethylene, preferably from 55 to 85.7% by weight, from 10 to 50% by weight of 1-butene, preferably from 14 to 44% by weight, from 0.2 to 2% by weight of acrylic acid or maleic acid or maleic anhydride, preferably from 0.3 to 1% by weight, or from 40 to 69.9% by weight of ethylene, preferably from 50 to 64.9% by weight, from 30 to 60% by weight of 1-octene, preferably from 35 to 49% by weight from 0.05 to 2% by weight of acrylic acid or maleic acid or maleic anhydride, preferably from 0.1 to 1% by weight.

The ethylene copolymers described above can be produced by processes known per se, preferably via random copolymerization at high pressure and elevated temperature.

The melt index of the ethylene copolymers is generally in the range from 1 to 80 g/10 min (measured at 190° C. with 2.16 kg load).

The molar mass of these ethylene-α-olefin copolymers is from 10 000 to 500 000 g/mol, preferably from 15 000 to 400 000 g/mol (Mn, determined by means of GPC in 1,2,4-trichlorobenzene with PS calibration).

One particular embodiment uses ethylene-α-olefin copolymers produced by means of what are known as single-site catalysts. Further details can be found in U.S. Pat. No. 5,272,236. The ethylene-α-olefin copolymers here have a molecular weight polydispersity which is narrow for polyolefins: smaller than 4, preferably smaller than 3.5.

Commercially available products B preferred for use are Exxelor® VA 1801 or 1803, Kraton® G 1901 FX or Fusabond® N NM493 D from Exxon, Kraton, and DuPont, and also Tafmer®MH 7010 from Mitsui.

It is also possible, of course, to use mixtures of the rubber types listed above.

Particular preference is given to copolymers II composed of $B_1$) from 50 to 98% by weight, in particular from 55 to 95% by weight, of ethylene $B_5$) from 0.1 to 40% by weight, in particular from 0.3 to 20% by weight, of glycidyl acrylate and/or glycidyl methacrylate, (meth)acrylic acid, and/or maleic anhydride, and $B_4$) from 1 to 45% by weight, in particular from 5 to 40% by weight, of n-butyl acrylate and/or 2-ethylhexyl acrylate.

Other preferred esters of acrylic and/or methacrylic acid are the methyl, ethyl, propyl, and isobutyl or tert-butyl esters.

Other comonomers that can also be used alongside these are vinyl esters and vinyl ethers.

The ethylene copolymers described above can be produced by processes known per se, preferably via random copolymerization at high pressure and elevated temperature. Appropriate processes are well known.

Other preferred elastomers are emulsion polymers, production of which is described, for example, by Blackley in the monograph "Emulsion Polymerization". The emulsifiers and catalysts that can be used are known per se.

Particular preference is given to copolymers II which comprise no units $B_5$), where the acid component $B_4$) has however been neutralized with Zn. Preference is given here to ethylene-(meth)acrylic acid copolymers which have been neutralized to an extent of up to 72% with zinc (available commercially as Surlyn® 9520 from DuPont).

The molding compositions of the invention comprise, as component C), from 0.1 to 10% by weight, preferably from 0.25 to 5% by weight, and in particular from 0.5 to 3% by weight, of a copolymer of:

$C_1$) from 50 to 95% by weight, preferably from 60 to 85% by weight, of styrene or substituted styrenes of the general formula I or a mixture of these

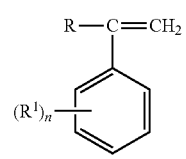

in which R is an alkyl radical having from 1 to 8 carbon atoms or a hydrogen atom and $R^1$ is an alkyl radical having from 1 to 8 carbon atoms and n has the value 0, 1, 2, or 3, and $C_2$) from 5 to 50% by weight, preferably from 15 to 40% by weight, of structural units derived from one or more dicarboxylic anhydrides.

Preferred radicals R are methyl, ethyl, and hydrogen.
Preferred radicals $R^1$ are methyl and ethyl.

Preferred components $C_1$) are styrene, α-methylstyrene, and mixtures of these.

Any of the dicarboxylic anhydrides known to the person skilled in the art and described in the prior art can be used as component $C_2$); it is preferable to use maleic anhydride, methylmaleic anhydride, itaconic anhydride, or a mixture of these; it is particularly preferable to use maleic anhydride.

It is preferable to use, as component C), a copolymer of styrene ($C_1$) and maleic anhydride ($C_2$).

Preference is given to copolymers C) with a ratio of from 1:1 to 8:1, preferably from 2:1 to 5:1, for the units $C_1$:$C_2$.

Copolymers of this type are usually obtainable via free-radical polymerization.

Examples of possible solvents are N,N-dimethylformamide/DMF) at 60° C. with 2,2'-azobisiso-butyronitrile as initiator (cf. Baruah S. D., Laskar N. C. Styrene-maleic anhydride copolymers: Synthesis characterization, and thermal properties. J. Appl. Polymer Science 60 (1996), 649-656) or else toluene (e.g. Vora R. A. et al., Synthesis and characterization of styrene-maleic anhydride copolymers, J. Polym. Mater. 12 (1995), 111-120).

Suitable materials are commercial high-molecular-weight copolymers C) with molar masses ($M_w$) between about 65 000 and 180 000 g/mol and with maleic anhydride contents of from 15 to 28% (Polyscope).

Preference is given to copolymers C) with molar masses ($M_w$) of from 5000 to 25 000 g/mol, preferably from 8000 to 15 000 g/mol. Products of this type are obtainable with trademark SMA® from Cray Valley or Joncryl® ADR 3229 from BASF SE.

The molding compositions of the invention comprise, as component D), from 0.001 to 20% by weight, preferably from 0.05 to 10% by weight, and in particular from 0.1 to 5% by weight, of iron powder, preferably with a particle size of at most 10 μm ($d_{50}$ value). Preferred Fe powders are obtainable via thermal decomposition of pentacarbonyl iron.

Iron occurs in a number of allotropes:
1. α-Fe (ferrite) forms space-centered cubic lattices, is magnetizable, dissolves a small amount of carbon, and occurs in pure iron up to 928° C. At 770° C. (Curie temperature) it loses its ferromagnetic properties and becomes paramagnetic; iron in the temperature range from 770 to 928° C. is also termed β-Fe. At normal temperature and at a pressure of at least 13 000 MPa, α-Fe becomes what is known as ε-Fe with a reduction of about 0.20 cm³/mol in volume, whereupon density increases from 7.85 to 9.1 (at 20 000 MPa).
2. γ-Fe (austenite) forms face-centered cubic lattices, is nonmagnetic, dissolves a large amount of carbon, and is observable only in the temperature range from 928 to 1398° C.
3. δ-Fe, space-centered, exists at from 1398° C. to the melting point of 1539° C.

Metallic iron is generally silver-white, density 7.874 g/cm³ (heavy metal), m.p. 1539° C., boiling point 2880° C.; specific heat (from 18 to 100° C.) about 0.5 $g^{-1}$ $K^{-1}$, tensile strength from 220 to 280 N/mm². The values apply to chemically pure iron.

Iron is produced industrially by smelting of iron ores, iron slag, burnt ores, or blast-furnace-flue dust, and by resmelting of scrap and alloys.

The iron powder of the invention is preferably produced via thermal decomposition of pentacarbonyl iron, preferably at temperatures of from 150° C. to 350° C. The particles thus obtainable are preferably of spherical shape or almost spherical shape (another term used being spherolitic).

The particle size distribution of preferred iron powder is as described below, and the particle size distribution here is determined by means of laser scattering in a highly dilute aqueous suspension (e.g. by using Beckmann LS13320 equipment). Grinding and/or sieving can optionally be used for adjustment to the particle size (and distribution) described below.

The meaning of $d_{xx}$ is that XX % of the total volume of the particles are smaller than the value.

$D_{50}$ values: at most 10 μm, preferably from 1.6 to 8 μm, in particular from 2.9 to 7.5 μm, very particularly from 3.4 to 5.2 μm $d_{10}$ values: preferably from 1 to 5 μm, in particular from 1 to 3 μm, and very particularly from 1.4 to 2.7 μm $d_{90}$ values: preferably from 3 to 35 μm, in particular from 3 to 12 μm, and very particularly from 6.4 to 9.2 μm.

The iron content of component D) is preferably from 97 to 99.8 g/100 g, with preference from 97.5 to 99.6 g/100 g. The content of other metals is preferably below 1000 ppm, in particular below 100 ppm, and very particularly below 10 ppm.

Fe content is usually determined by infrared spectroscopy.

C content is preferably from 0.01 to 1.2 g/100 g, preferably from 0.05 to 1.1 g/100 g, and in particular from 0.4 to 1.1 g/100 g. This C content in the preferred iron powders is appropriate for iron powders which are not reduced with hydrogen after the thermal decomposition process.

C content is usually determined by a method based on ASTM E1019 via combustion of the specimen in a stream of oxygen followed by IR detection of the $CO_2$ gas produced (by means of a Leco CS230 or CS-mat 6250 from Juwe).

Nitrogen content is preferably at most 1.5 g/100 g, preferably from 0.01 to 1.2 g/100 g. Oxygen content is preferably at most 1.3 g/100 g, with preference from 0.3 to 0.65 g/100 g. N and O are determined via heating of the specimen in a graphite oven to about 2100° C. The oxygen comprised in the specimen here is converted to CO and measured by way of an IR detector. The N liberated from the N-containing compounds under the reaction conditions is discharged with the carrier gas and detected by means of a thermal conductivity (TC) detector and recorded (both methods being based on ASTM E1019).

Tap density is preferably from 2.5 to 5 g/cm³, in particular from 2.7 to 4.4 g/cm³. This generally means the density after the powder has been compacted by, for example, charging to, and vibrating in, a container.

Iron powders to which preference is further given can have a surface coating of iron phosphate, iron phosphite, or $SiO_2$.

BET surface area in accordance with DIN ISO 9277 is preferably from 0.1 to 10 m²/g, in particular from 0.1 to 5 m²/g, with preference from 0.2 to 1 m²/g, and in particular from 0.4 to 1 1 m²/g.

In order to obtain particularly good distribution of the iron particles, a masterbatch with a polymer can be used. Suitable polymers for this purpose are those such as polyolefins, polyesters, or polyamides, and it is preferable here that the masterbatch polymer is the same as component A). The proportion by mass of the iron in the polymer is generally from 15 to 80% by mass, preferably from 20 to 40% by mass.

The molding compositions of the invention comprise, as component E), from 0.05 to 3% by weight, preferably from 0.1 to 1.5% by weight, and in particular from 0.1 to 1% by weight, of a Cu stabilizer, preferably of a Cu(I) halide, in particular in a mixture with an alkali metal halide, preferably KI, in particular in a ratio of 1:4.

Preferred salts of monovalent copper used are cuprous acetate, cuprous chloride, cuprous bromide, and cuprous iodide. The materials comprise these in amounts of from 5 to 500 ppm of copper, preferably from 10 to 250 ppm, based on polyamide.

The advantageous properties are in particular obtained if the copper is present with molecular distribution in the polyamide. This is achieved if a concentrate comprising polyamide, and comprising a salt of monovalent copper, and comprising an alkali metal halide in the form of a solid, homogeneous solution, is added to the molding composition. By way of example, a typical concentrate is composed of from 79 to 95% by weight of polyamide and from 21 to 5% by weight of a mixture composed of copper iodide or copper bromide and potassium iodide. The copper concentration in the solid homogenous solution is preferably from 0.3 to 3% by weight, in particular from 0.5 to 2% by weight, based on the total weight of the solution, and the molar ratio of cuprous iodide to potassium iodide is from 1 to 11.5, preferably from 1 to 5.

Particularly suitable concentrates are those using PA6 and/or PA66.

The molding compositions of the invention comprise, as component F), from 100 ppm to 5% by weight, preferably from 500 ppm to 1% by weight, and in particular from 0.01 to 0.3% by weight, of a phosphorus-containing inorganic acid or salts thereof or ester derivatives thereof or a mixture thereof.

Preferred acids are the oxo acids of phosphorus, e.g. hypophosphorous acid (phosphinic acid), phosphorous acid, phosphoric acid, and mixtures of these.

Suitable metal cations for these salts are transition metal cations or alkali metal cations or alkaline earth metal cations, particular preference being given here to calcium, barium, magnesium, sodium, potassium, manganese, aluminum, and mixtures of these.

Particularly preferred salts are Na hypophosphite, manganese(II) hypophosphite $Mn(H_2PO_2)_2$, aluminum hypophosphite, and mixtures of these.

Suitable preferred ester derivatives (phosphonates or salts thereof) of the oxo acids of phosphorus are those bearing identical or different alkyl radicals having from 1 to 4 carbon atoms or aryl radicals having from 6 to 14 carbon atoms as substituents.

Examples of preferred compounds are the Ca phosphonate obtainable as Irgamod® 195 from BASF SE and the diethyl phosphonate obtainable as Irgamod® 295 from BASF SE.

In the invention, the thermoplastic molding compositions can comprise, as component G), from 0 to 2% by weight of at least one polyethyleneimine homo- or copolymer. The proportion of G) is preferably from 0.01 to 2% by weight and in particular from 0.1 to 1% by weight, and very particularly preferably from 0.1 to 0.5% by weight, based on A) to H), and preference is given here to branched polyethyleneimines.

For the purposes of the present invention, the expression "polyethyleneimines" means homo- or copolymers which are obtainable by way of example by the processes in Ullmann Electronic Release under keyword "Aziridines" or in accordance with WO-A 94/12560.

The homopolymers are generally obtainable via polymerization of ethyleneimine (aziridine) in aqueous or organic solution in the presence of compounds which cleave to give acids, or of Lewis acids or of other acids. These homopolymers are branched polymers which generally comprise primary, secondary, and tertiary amino groups in a ratio of about 30%:40%:30%. The distribution of the amino groups can generally be determined by means of $^{13}C$ NMR spectroscopy. It is preferably from 1/0.7-1.4/0.3-1.1 to 1/0.8-1.3/0.5-0.9.

Comonomers used are preferably compounds which have at least two amino functions. Examples that may be mentioned of suitable comonomers are alkylenediamines having from 2 to 10 carbon atoms in the alkylene radical, preference being given here to ethylenediamine and propylenediamine. Comonomers having further suitability are diethylenetriamine, triethylenetetramine, tetraethylenepentamine, dipropylenetriamine, tripropylenetetramine, dihexamethylenetriamine, aminopropylethylenediamine, and bisaminopropylethylenediamine.

The average molecular weight (weight average) of polyethyleneimines is usually from 100 to 3 000 000, preferably from 500 to 2 000 000 (determined by light scattering). The preferred molecular weight $M_w$ is from 700 to 1 500 000, in particular from 1000 to 500 000.

Other suitable compounds are crosslinked polyethyleneimines obtainable via reaction of polyethyleneimines with bi- or polyfunctional crosslinking agents which have, as functional group, at least one halohydrin unit, glycidyl unit, aziridine unit, isocyanate unit, or one halogen atom. Examples that may be mentioned are epichlorohydrin or bischlorohydrin ethers of polyalkylene glycols having from 2 to 100 ethylene oxide units and/or propylene oxide units, and also the compounds listed in DE-A 19 93 17 20 and U.S. Pat. No. 4,144,123. Processes for the production of crosslinked polyethyleneimines are known inter alia from the abovementioned specifications, and also EP-A 895 521 and EP-A 25 515.

Grafted polyethyleneimines are also suitable, and the grafting agents that can be used comprise any of the compounds which can react with the amino or imino groups of the polyethyleneimines. Suitable grafting agents and processes for the production of grafted polyethyleneimines are found by way of example in EP-A 675 914.

Polyethyleneimines likewise suitable for the purposes of the invention are amidated polymers, which are usually obtainable via reaction of polyethyleneimines with carboxylic acids, their esters or anhydrides, or carboxamides, or carbonyl halides. As a function of the proportion of the amidated nitrogen atoms in the polyethyleneimine chain, the amidated polymers can be subsequently crosslinked using the crosslinking agents mentioned. It is preferable that up to 30% of the amino functions are amidated here, in order that there are sufficient primary and/or secondary nitrogen atoms available for a subsequent crosslinking reaction.

Other suitable compounds are alkoxylated polyethyleneimines, which are by way of example obtainable via reaction of polyethyleneimine with ethylene oxide and/or with propylene oxide. These alkoxylated polymers can also be subsequently crosslinked.

Other suitable polyethyleneimines of the invention that may be mentioned are polyethyleneimines containing hydroxy groups and amphoteric polyethyleneimines (incorporation of anionic groups), and also lipophilic polyethyleneimines, which are generally obtained via incorporation of long-chain hydrocarbon radicals into the polymer chain. Processes for the production of these polyethyleneimines are known to the person skilled in the art, and further details in this connection would therefore be superfluous.

The molding compositions of the invention can comprise, as component H), up to 60% by weight, preferably up to 50% by weight, of further additives.

Fibrous or particulate fillers H) that may be mentioned are carbon fibers, glass fibers, glass beads, amorphous silica, calcium silicate, calcium metasilicate, magnesium carbonate, kaolin, chalk, powdered quartz, mica, barium sulfate and feldspar, used in amounts of from 1 to 50% by weight, in particular from 5 to 40% by weight, preferably from 10 to 40% by weight.

Preferred fibrous fillers which may be mentioned are carbon fibers, aramid fibers and potassium titanate fibers, and particular preference is given to glass fibers in the form of E glass. These may be used as rovings or in the commercially available forms of chopped glass.

The fibrous fillers may have been surface-pretreated with a silane compound to improve compatibility with the thermoplastic.

Suitable silane compounds have the general formula:

where:

X is $NH_2$—,

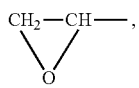

HO—, n is an integer from 2 to 10, preferably from 3 to 4, m is an integer from 1 to 5, preferably from 1 to 2, and k is an integer from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which comprise a glycidyl group as substituent X.

The amounts of the silane compounds generally used for surface-coating are from 0.01 to 2% by weight, preferably from 0.025 to 1.0% by weight and in particular from 0.05 to 0.5% by weight (based on H).

Long glass fibers are also suitable as component H) and these can be used as rovings. The diameter of the glass fibers used as rovings in the invention is from 6 to 20 μm, preferably from 10 to 18 μm, and the cross section of the glass fibers here is round, oval, or polygonal. In particular, E glass fibers are used in the invention. However, it is also possible to use any of the other types of glass fiber, e.g. A, C, D, M, S, or R glass fibers or any desired mixture thereof, or a mixture with E glass fibers.

It is preferable that the L/D (length/diameter) ratio is from 100 to 4000, in particular from 350 to 2000, and very particularly from 350 to 700.

Acicular mineral fillers are also suitable.

For the purposes of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may, if appropriate, have been pretreated with the abovementioned silane compounds, but the pretreatment is not essential.

Other fillers which may be mentioned are kaolin, calcined kaolin, wollastonite, talc and chalk, and also lamellar or acicular nanofillers, the amounts of these preferably being from 0.1 to 10%. Materials preferred for this purpose are boehmite, bentonite, montmorillonite, vermiculite, hectorite, and laponite. The lamellar nanofillers are organically modified by prior-art methods, to give them good compatibility with the organic binder. Addition of the lamellar or acicular nanofillers to the inventive nanocomposites gives a further increase in mechanical strength.

The inventive molding compositions can comprise, as component H), from 0.05 to 3% by weight, preferably from 0.1 to 1.5% by weight, and in particular from 0.1 to 1% by weight, of a lubricant.

Preference is given to the Al, alkali metal, or alkaline earth metal salts, or esters or amides of fatty acids having from 10 to 44 carbon atoms, preferably having from 12 to 44 carbon atoms.

The metal ions are preferably alkaline earth metal and Al, particular preference being given to Ca or Mg.

Preferred metal salts are Ca stearate and Ca montanate, and also Al stearate.

It is also possible to use a mixture of various salts, in any desired mixing ratio.

The carboxylic acids can be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols can be monohydric to tetrahydric. Examples of alcohols are n-butanol or n-octanol, stearyl alcohol, ethylene glycol, propylene glycol, neopentyl glycol, pentaerythritol, preference being given to glycerol and pentaerythritol.

The aliphatic amines can be mono- to tribasic. Examples of these are stearylamine, ethylenediamine, propylenediamine, hexamethylenediamine, di(6-aminohexyl)amine, particular preference being given to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use a mixture of various esters or amides, or of esters with amides in combination, in any desired mixing ratio.

Suitable sterically hindered phenols H) are in principle any of the compounds having a phenolic structure and having at least one bulky group on the phenolic ring.

By way of example, compounds of the formula

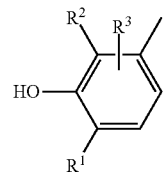

can preferably be used, in which:

$R^1$ and $R^2$ are an alkyl group, a substituted alkyl group, or a substituted triazole group, where the radicals $R^1$ and $R^2$ can be identical or different, and $R^3$ is an alkyl group, a substituted alkyl group, an alkoxy group, or a substituted amino group.

Antioxidants of the type mentioned are described by way of example in DE-A 27 02 661 (U.S. Pat. No. 4,360,617).

Another group of preferred sterically hindered phenols is those derived from substituted benzenecarboxylic acids, in particular from substituted benzenepropionic acids.

Particularly preferred compounds from this class are compounds of the formula

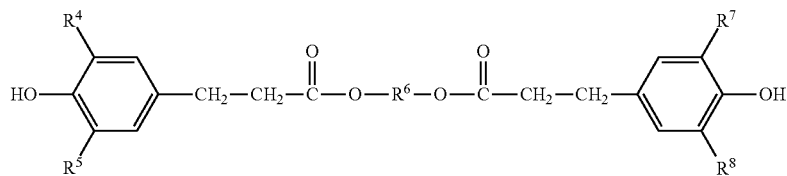

where $R^4$, $R^5$, $R^7$, and $R^8$, independently of one another, are $C_1$-$C_8$-alkyl groups which themselves may have substitution (at least one of these being a bulky group), and $R^6$ is a divalent aliphatic radical which has from 1 to 10 carbon atoms and whose main chain may also have C—O bonds.

Preferred compounds corresponding to these formulae are

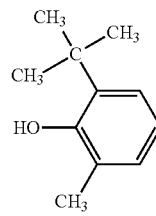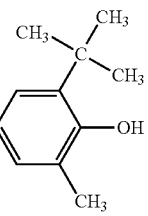

(Irganox® 245 from BASF SE)

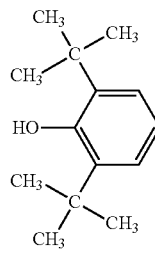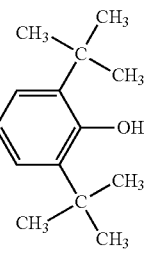

(Irganox® 259 from BASF SE)

All of the following should be mentioned as examples of sterically hindered phenols:

2,2'-methylenebis(4-methyl-6-tert-butylphenol), 1,6-hexanediol bis[3-(3,5-di-tert-butyl-4-hydroxyphenyl)propionate], pentaerythrityl tetrakis[3-(3,5-di-tert-butyl-4-hydroxyphenyl)-propionate], distearyl 3,5-di-tert-butyl-4-hydroxybenzylphosphonate, 2,6,7-trioxa-1-phosphabicyclo[2.2.2]oct-4-ylmethyl 3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxybenzyl)benzene, 4,4'-methylenebis(2,6-di-tert-butylphenol), 3,5-di-tert-butyl-4-hydroxybenzyldimethylamine.

Compounds which have proven particularly effective and which are therefore used with preference are 2,2'-methylenebis(4-methyl-6-tert-butylphenol), 1,6-hexanediol bis(3,5-di-tert-butyl-4-hydroxyphenyl]propionate (Irganox® 259), pentaerythrityl tetrakis[3-(3,5-di-tert-butyl-4-hydroxyphenyl)propionate], and also N,N'-hexamethylenebis-3,5-di-tert-butyl-4-hydroxyhydrocinnamide (Irganox® 1098), and the product Irganox® 245 described above from Ciba Geigy, which has particularly good suitability.

The amount comprised of the antioxidants H), which may be used individually or as a mixture, is from 0.05 up to 3% by weight, preferably from 0.1 up to 1.5% by weight, in particular from 0.1 to 1% by weight, based on the total weight of the molding compositions A) to G).

In some cases, sterically hindered phenols having no more than one sterically hindered group in ortho-position with respect to the phenolic hydroxy group have proven particularly advantageous, in particular when assessing colorfastness on storage in diffuse light over relatively long periods.

Preferred components H) have not only a P-containing substituent but also a sterically hindered phenol system and are available commercially by way of example as Irgafos®168, Irgafos® TPP, Irgafos® TNPP, or Irgafos® P-EPQ (phosphonite) from BASF SE.

The molding compositions of the invention can comprise, as component H), from 0.05 to 5% by weight, preferably from 0.1 to 2% by weight, and in particular from 0.25 to 1.5% by weight, of a nigrosin.

Nigrosins are generally various embodiments (water-soluble, fat-soluble, petroleum-soluble) of a group of black or gray phenazine dyes (azine dyes) related to the indulins and used in wool dyeing, wool printing, black dyeing of silk, for the coloring of leather, of shoe polishes, of varnishes, of plastics, of stoving lacquers, of inks, and the like, and also as microscopy dyes.

Nigrosins are obtained industrially via heating of nitrobenzene, aniline, and aniline hydrochloride with metallic iron and $FeCl_3$ (name from the Latin niger=black).

Component H) can be used in the form of free base or else in the form of salt (e.g. hydrochloride).

Further details relating to nigrosins are found by way of example in the electronic Lexikon Römpp Online [Römpp's On-line Encyclopedia], Version 2.8, Thieme-Verlag Stuttgart, 2006, keyword "Nigrosin".

The thermoplastic molding compositions of the invention can comprise, as component H), conventional processing aids, such as stabilizers, oxidation retarders, agents to counteract decomposition by heat and decomposition by ultraviolet light, lubricants and mold-release agents, colorants, such as dyes and pigments, nucleating agents, plasticizers, etc.

Examples that may be mentioned of oxidation retarders and heat stabilizers are sterically hindered phosphites and amines (e.g. TAD), hydroquinones, aromatic secondary amines, such as diphenylamines, various substituted representatives of these groups, and mixtures of these, in concentrations up to 1% by weight, based on the weight of the thermoplastic molding compositions.

UV stabilizers that may be mentioned, these generally being used in amounts of up to 2% by weight, based on the molding composition, are various substituted resorcinols, salicylates, benzotriazoles, and benzophenones.

Colorants that may be added are inorganic pigments, such as titanium dioxide, ultramarine blue, iron oxide and carbon black, and also organic pigments, such as phthalocyanines, quinacridones, perylenes, and also dyes, such as anthraquinones.

Flame retardants that may be mentioned are phosphorus and P- and N-containing compounds.

Nucleating agents that can be used are sodium phenylphosphinate, aluminum oxide, silicon dioxide, and also preferably talc powder.

The thermoplastic molding compositions of the invention can be produced by processes known per se, by mixing the starting components in conventional mixing apparatuses, such as screw-based extruders, Brabender mixers, or Banbury mixers, and then extruding them. The extrudate can be cooled and comminuted. It is also possible to premix individual components and then to add the remaining starting materials individually and/or likewise in mixed form. The mixing temperatures are generally from 230 to 320° C.

In another preferred mode of operation, components B) to G), and also, if appropriate, H) can be mixed, compounded, and pelletized with a prepolymer. The resultant pellets are then solid-phase condensed continuously or batchwise under an inert gas at a temperature below the melting point of component A) until the desired viscosity has been reached.

The long-glassfiber-reinforced polyamide molding compositions of the invention can be produced by the known processes for producing elongate long-fiber-reinforced pellets, in particular by pultrusion processes, in which the continuous fiber strand (roving) is completely saturated with the polymer melt and then is cooled and chopped. The elongate long-fiber-reinforced pellets obtained in this manner, preferably with pellet length of from 3 to 25 mm, in particular from 5 to 14 mm, can be further processed by the usual processing methods (e.g. injection molding, compression molding) to give moldings.

The preferred L/D ratio of the pellets after pultrusion is preferably from 2 to 8, in particular from 3 to 4.5.

Particularly good properties can be achieved in the molding by using non-aggressive processing methods. The expression "non-aggressive" in this context particularly means substantial avoidance of excessive fiber breakage and of the attendant severe reduction of fiber length. In the case of injection molding this means preferred use of screws with large diameter and low compression ratio, in particular smaller than 2, and generously dimensioned nozzle channels and feed channels. A complementary factor to which attention should be paid is that high cylinder temperatures are used that rapidly melt the elongate pellets (contact heating) and that the fibers are not excessively comminuted through excessive exposure to shear. When these measures are adopted in the invention, moldings are obtained which have higher average fiber length than comparable moldings produced from short-fiber-reinforced molding compositions. This gives an additional improvement in properties, in particular in relation to tensile modulus and modulus of elasticity, ultimate tensile strength, and notched impact resistance.

Fiber length after processing of the molding, e.g. via injection molding, is usually from 0.5 to 10 mm, in particular from 1 to 3 mm.

The thermoplastic molding compositions of the invention feature good melt strength and good processability, in particular in the extrusion blow molding process (3D suction blow molding or 3D application processes) or injection stretch blow molding, together with good mechanical properties, and also markedly improved weld line strength and surface, and also thermal stability (in particular HAR).

These materials are suitable for producing moldings of any type.

Some examples are mentioned below:
pipes
reservoirs/tanks
turbo-charger pipes (cold and hot side), (charge-air pipes)
air ducts
ventilation hoses/pipes (e.g. for crankcases)
solar thermal energy/heat exchangers
air-conditioning technology
compressors/compaction/pumps
ovens
superheated steam
pipes and hoses for oil aeration or cooling water
pipes and hoses for air-conditioning
bellows
resonator housings
capsules, sleeves, e.g. for shock absorbers
casings
pressure accumulators

EXAMPLES

The following components were used:
Component A/1
Nylon-6,6 with intrinsic viscosity IV 205 ml/g, measured on a 0.5% by weight solution in 96% by weight sulfuric acid at 25° C. in accordance with ISO 307. (Ultramid® A34 from BASF SE was used.)
Component A/2
PA 6 with IV 250 ml/g (Ultramid® B40 from BASF SE).
Component B)
Ethylene-methacrylic acid copolymer (90/10), neutralized to an extent of about 70% with zinc (Surlyn® 9520 from DuPont)
Component C)
Styrene-maleic anhydride copolymer (3:1) (SMA® 3000P from Cray Valley)
$M_w$=9500 g/mol
$M_n$=3800 g/mol
Component D)
Iron powder CAS No. 7439-89-6 (see page 11) of description for determination of Fe, C, N, and O content used in the form of 25% masterbatch in PA 66.

| | | | |
|---|---|---|---|
| Fe | g/100 g | at least 97.7 | IR detection |
| C | g/100 g | at most 1.0 | IRS |
| N | g/100 g | at most 1.0 | TCD |
| O | g/100 g | at most 0.6 | IRS |

Particle size distribution: (laser scattering using Beckmann LS13320)

| | |
|---|---|
| $d_{10}$ | 1.4 to 2.7 μm |
| $d_{50}$ | 2.9 to 4.2 μm |
| $d_{90}$ | 6.4 to 9.2 μm |

BET surface area 0.44 m$^2$/g (DIN ISO 9277)
Component E)
CuI/KI in a ratio of 1:4 (20% masterbatch in PA 6)
Component F)
NaH$_2$PO$_2$×1 H$_2$O
Component G)

| Lupasol ® | WF |
|---|---|
| M$_W$ | 25 000 |
| Prim./sec./tert. amines | 1/1.2/0.76 |

Lupasol®=registered trademark of BASF SE
$^{13}$C NMR spectroscopy was used to determine the primary/secondary/tertiary amines ratio.
Component H/1
Glass fibers (chopped glass fiber with thickness about 10 μm).
Component H/2
Nigrosin (40% in PA 6)
The molding compositions (predrying to <0.05%) were produced in a (ZSK) MC26 with throughput 10 kg/h and flat temperature profile at about 280° C.
Rotation rate 300 rpm
Die diameter 4 mm
The following measurements were made:
Roughness measurement Rz
Rz is what is known as maximum roughness profile height in accordance with DIN EN ISO 4287
Rz is determined as arithmetic average from the maximum profile heights from 5 individual measurements.
The sampling lengths for the individual measurements Ir are 2.5 mm, the cutoff wavelength λc=2.5 mm, the traversed length It is 15 mm and the total measured length In=12.5 mm. The traverse speed vt is 0.5 mm/s. The TK300 sensor (Hommelwerke) is used, the sensor tip radius $r_{SP\ max}$ is 5 μm, and the digitization spacing $\Delta x_{max}$ is 1.5 μm.
Class 4: <30 μm
Class 3: 30-50 μm
Class 2: 50-70 μm
Class 1: >70 μm
Sagging test—Stability of parison.
Vertical extrusion of a tube by means of a capillary rheometer and monitoring of length change and of tube diameter under its own weight after extrusion has stopped
An annular die was used for this purpose (dimensions: length L within cylindrical gap 10 mm, internal diameter 8 mm, external diameter 9 mm) in conjunction with a capillary rheometer from Göttfert.
Experimental parameters:
Göttfert Rheograph 2003 capillary rheometer
Temperature: 275° C.
Melting time in rheometer: 5 min
Reservoir diameter: 12 mm
Ram advance speed: 20 mm/s
Extrusion time: 5 s
Procedure:
30 g of polymer were charged at 275° C. to the Göttfert Rheograph 2003.
The specimen was compressed with the aid of the ram after melting.
The ram was moved downward until the scale indicator was at 17.2 cm.
The die outlet was then cleaned and the ram was moved downward to 17 cm.
An extruded strand of length about 1 cm formed underneath the die here, and was not removed.
After the melting time of 5 minutes, the machine initiated the ram advance at 20 mm/s for 5 seconds. The strand discharged from the die was filmed with a video camera.
In order to identify the stopping of the ram in the film, a laser pointer was projected (manually) into the film for the duration of the extrusion process. By virtue of a scale with specimen identification behind the strand, it was possible through subsequent inspection of the film to evaluate the strand length at the moment at which the ram stopped.
As soon as sagging of the strand ceased, the film was stopped and the test was terminated. The resultant tube was removed after cooling.
The weight, length, and diameter of the specimen strand were determined.
For the diameter, a caliber gage is used to measure the maximum diameter about 2 cm below the bead on the specimen.
Evaluation:
The resistance of the parison to deformation was quantified via calculation of the sagging ratio SR. SR involves calculating a ratio of the lengths of the extruded tube once ram advance has ended after 5 s of extrusion time (L1) to the length of the tube after complete cooling (L2):

$$SR = \left(\frac{L2}{L1} - 1\right) \cdot 100\%$$

Visual assessment of blow molding performance
Criteria:
1. Sagging of the parison (axial differences in wall thickness over entire component length).
2. Swelling on exit from die (where swelling determines the average wall thickness—for a given die gap—in the component).
3. Surface quality, internal and external.
4. Welding of weld lines downstream of spider
Classification: 1 (defective) to 5 (very good)
Mechanical properties:
The tensile test was carried out in accordance with ISO 527-2 prior to and after heat-aging at 200° C. for 500 and 1000 hours, and also at 220° C. for 500 and 1000 hours.
The table will show the constitiutions of the molding compositions and the results of the tests.

TABLE 1

| | Components [% by wt.] | | | | | | | | |
|---|---|---|---|---|---|---|---|---|---|
| Examples | A/1 | B | C | D | E | G | H/1 | F | A/2 H/2 |
| Comparative example 1 | 64 | 20 | 1 | | | 15 | | | |

TABLE 1-continued

| Examples | A/1 | B | C | D | E | G | H/1 | F | A/2 | H/2 |
|---|---|---|---|---|---|---|---|---|---|---|
| Comparative example 2 | 69.25 | | | 4 | 1.5 | 0.25 | 15 | | 10 | |
| Comparative example 3 | 48.25 | 20 | 1 | 4 | 1.5 | 0.25 | 15 | | 10 | |
| Inventive example 1 | 48.4 | 20 | 1 | 4 | 1.5 | | 15 | 0.1 | 10 | |
| Inventive example 2 | 46.5 | 20 | 1 | 4 | 1.5 | | 15 | 0.1 | 10 | 1.9 |
| Inventive example 3 | 48.15 | 20 | 1 | 4 | 1.5 | 0.25 | 15 | 0.1 | 10 | |
| Inventive example 4 | 46.25 | 20 | 1 | 4 | 1.5 | 0.25 | 15 | 0.1 | 10 | 1.9 |

TABLE 2

| | Sagging ratio SR [%] | Surface roughness RZ [class] | Blow-molding performance [class] | Tensile test prior to heat-aging | | | Tensile test after heat-aging at 200° C. for 500 h | | |
|---|---|---|---|---|---|---|---|---|---|
| | | | | Yield stress [MPa] | Tensile strain at break [%] | Modulus of elasticity [MPa] | Yield stress [MPa] | Tensile strain at break [%] | Modulus of elasticity [MPa] |
| Comparative example 1 | 3.6 | 2 | 4 | 193.64 | 6.0 | 4814 | 100.33 | 3.42 | 5180 |
| Comparative example 2 | >100 | 4 | 1 | 128.17 | 3.01 | 5944 | 98.8 | 1.7 | 6405 |
| Comparative example 3 | >100 | 3 | 1 | 107.79 | 7.5 | 4695 | 107.17 | 8.79 | 4854 |
| Inventive example 1 | 9.3 | 3 | 5 | 99.65 | 9.04 | 4895 | 107.67 | 8.88 | 4994 |
| Inventive example 2 | 10.6 | 3 | 5 | 96.61 | 6.91 | 4870 | 112.95 | 7.2 | 5092 |
| Inventive example 3 | 7.4 | 4 | 4 | 9915 | 9.37 | 4914 | 107.4 | 9.24 | 4953 |
| Inventive example 4 | 16.7 | 4 | 4 | n.d. | n.d. | n.d. | n.d. | n.d. | n.d. |

TABLE 3

| | Tensile test after heat-aging at 200° C. for 1000 h | | | Tensile test after heat-aging at 220° C. for 500 h | | | Tensile test after heat-aging at 220° C. for 1000 h | | |
|---|---|---|---|---|---|---|---|---|---|
| | Yield stress [MPa] | Tensile strain at break [%] | Modulus of elasticity [MPa] | Yield stress [MPa] | Tensile strain at break [%] | Modulus of elasticity [MPa] | Yield stress [MPa] | Tensile strain at break [%] | Modulus of elasticity [MPa] |
| Comparative example 1 | 67.19 | 1.6 | 5194 | 68.08 | 1.84 | 5036 | 45.37 | 1.33 | 4971 |
| Comparative example 2 | 103.29 | 1.83 | 6362 | 99.66 | 1.68 | 6565 | 95.22 | 1.56 | 6684 |
| Comparative example 3 | 103.17 | 7.25 | 4740 | 98.73 | 4.72 | 4889 | 105.59 | 4.42 | 4806 |
| Inventive example 1 | 103.66 | 8.76 | 4858 | 99.85 | 8.7 | 4980 | 92.92 | 8.16 | 4849 |
| Inventive example 2 | 108.2 | 7.04 | 5027 | 102.29 | 7.87 | 5069 | 96.6 | 4.5 | 4992 |
| Inventive example 3 | 104.62 | 8.03 | 4846 | 100.68 | 7.81 | 4957 | 102.09 | 6.57 | 5017 |
| Inventive example 4 | n.d. | n.d. | n.d. | n.d. | n.d. | n.d. | n.d. | n.d. | n.d. |

The invention claimed is:

1. A thermoplastic molding composition comprising
A) from 10 to 94% by weight of a polyamide,
B) from 10 to 25% by weight of an impact modifier selected from the group consisting of
a copolymer I of
  $B_1$) from 35 to 89.9% by weight of ethylene
  $B_2$) from 10 to 60% by weight of 1-octene or 1-butene or propylene or a mixture of these and
  $B_3$) from 0.05 to 5% by weight of functional monomers, where the functional monomers are selected from the group consisting of the carboxylic acid groups, carboxylic anhydride groups, carboxylic ester groups, carboxamide groups, carboximide groups, amino groups, hydroxy groups, epoxy groups, urethane groups, oxazoline groups, and mixtures thereof, a copolymer II of
  B$_1$) from 50 to 98% by weight of ethylene
  B$_4$) from 2 to 50% by weight of acrylic acid or methacrylic acid, and
  B$_5$) optionally from 0 to 20% by weight of functional monomers selected from the group consisting of carboxylic anhydride groups, epoxy groups, and mixtures thereof,
or a mixture of copolymer I and copolymer II,
C) from 0.1 to 10% by weight of a copolymer of
  C$_1$) from 50 to 95% by weight of styrene or substituted styrenes of the general formula I or a mixture of these

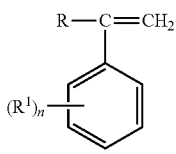

in which R is an alkyl radical having from 1 to 8 carbon atoms or a hydrogen atom and R$^1$ is an alkyl radical having from 1 to 8 carbon atoms and n has the value 0, 1, 2, or 3, and
  C$_2$) from 5 to 50% by weight of structural units derived from one or more dicarboxylic anhydrides,
D) from 0.001 to 20% by weight of iron powder wherein the C content of component D) is from 0.01 to 1.2 g/100 g when measured by a method based on ASTM E1019,
E) from 0.05 to 3% by weight of a copper-containing stabilizer,
F) from 100 ppm to 5% by weight of alkali metal salts or alkaline earth metal salts of oxo acids of phosphorus or a mixture of these,
G) from 0 to 2% by weight of a polyethyleneimine homo- or copolymer,
H) from 0 to 60% by weight of further additives selected from the group consisting of a fibrous filler, a particulate filler, a lubricant, a nigrosin, oxidation retarders, UV stabilizers, dyes, pigments, nucleating agents, heat stabilizers, flame retardants, mold release agents, and plasticizers,
wherein:
  the total of the percentages by weight of A) to H) is 100%,
  the molding composition exhibits a surface roughness of class 3 or class 4,
  the molding composition is free of free of copolymers comprising ethylene and (meth)acrylate co-monomers, and
  the molding composition is free of a sterically hindered phenol.

2. The thermoplastic molding composition according to claim 1, comprising
A) from 20 to 94% by weight
B) from 10 to 25% by weight
C) from 0.1 to 10% by weight
D) from 0.001 to 20% by weight
E) from 0.05 to 3% by weight
F) from 100 ppm to 5% by weight
G) from 0.01 to 2% by weight
H) from 0 to 50% by weight where the total of the percentages by weight of A) to H) is 100%.

3. The thermoplastic molding composition according to claim 1, comprising, as component C), a copolymer of styrene (C$_1$) and maleic anhydride (C$_2$).

4. The thermoplastic molding composition according to claim 1, comprising, as component C), a copolymer with a ratio of from 1:1 to 8:1 between the units C$_1$: C$_2$.

5. The thermoplastic molding composition according to claim 1, where the molar mass (M$_w$) of component C) is from 5000 to 25 000 g/mol.

6. The thermoplastic molding composition according to claim 1, wherein component B) is copolymer I or a mixture of copolymer I and copolymer II.

7. The thermoplastic molding composition according to claim 1, wherein component B) is copolymer II or a mixture of copolymer I and copolymer II, and copolymer II comprises an ethylene-(meth)acrylic acid copolymer which has been neutralized to an extent of up to 72% with zinc.

8. A molding comprising a thermoplastic molding compositions according to claim 1.

9. The molding of claim 8, wherein the molding is a blow molding.

10. The thermoplastic molding composition according to claim 1, where component F) comprises Na hypophosphite.

11. The thermoplastic molding composition according to claim 3, comprising, as component C), a copolymer with a ratio of from 1:1 to 8:1 between the units C$_1$: C$_2$.

12. The thermoplastic molding composition according to claim 11, where the molar mass (M$_w$) of component C) is from 5000 to 25 000 g/mol.

13. The thermoplastic molding composition according to claim 3, where component F) comprises Na hypophosphite.

14. The thermoplastic molding composition according to claim 3, wherein component B) is copolymer I or a mixture of copolymer I and copolymer II.

15. The thermoplastic molding composition according to claim 3, wherein component B) is copolymer II or a mixture of copolymer I and copolymer II, and copolymer II comprises an ethylene-(meth)acrylic acid copolymer which has been neutralized to an extent of up to 72% with zinc.

16. A thermoplastic molding composition comprising
A) from 10 to 94% by weight of a polyamide,
B) from 1 to 30% by weight of an impact modifier selected from the group consisting of
a copolymer I of
  B$_1$) from 35 to 89.9% by weight of ethylene
  B$_2$) from 10 to 60% by weight of 1-octene or 1-butene or propylene or a mixture of these and
  B$_3$) from 0.05 to 5% by weight of functional monomers, where the functional monomers are selected from the group consisting of the carboxylic acid groups, carboxylic anhydride groups, carboxylic ester groups, carboxamide groups, carboximide groups, amino groups, hydroxy groups, epoxy groups, urethane groups, oxazoline groups, and mixtures thereof,
a copolymer II of
  B$_1$) from 50 to 98% by weight of ethylene
  B$_4$) from 2 to 50% by weight of acrylic acid or methacrylic acid, and
  B$_5$) optionally from 0 to 20% by weight of functional monomers selected from the group consisting of carboxylic anhydride groups, epoxy groups, and mixtures thereof, or a mixture of copolymer I and copolymer II, C) from 0.1 to 10% by weight of a copolymer of
  $C_1$) from 50 to 95% by weight of styrene or substituted styrenes of the general formula I or a mixture of these

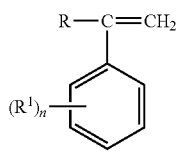

in which R is an alkyl radical having from 1 to 8 carbon atoms or a hydrogen atom and $R^1$ is an alkyl radical having from 1 to 8 carbon atoms and n has the value 0, 1, 2, or 3, and
  $C_2$) from 5 to 50% by weight of structural units derived from one or more dicarboxylic anhydrides, D) from 0.001 to 20% by weight of iron powder wherein the C content of component D) is from 0.01 to 1.2 g/100 g when measured by a method based on ASTM E1019, E) from 1 to 3% by weight of a copper-containing stabilizer, F) from 100 ppm to 5% by weight of alkali metal salts or alkaline earth metal salts of oxo acids of phosphorus or a mixture of these, G) from 0 to 2% by weight of a polyethyleneimine homo- or copolymer, H) from 0 to 60% by weight of further additives selected from the group consisting of a fibrous filler, a particulate filler, a lubricant, a nigrosin, oxidation retarders, UV stabilizers, dyes, pigments, nucleating agents, heat stabilizers, flame retardants, mold release agents, and plasticizers, wherein:
  the total of the percentages by weight of A) to H) is 100%,
  the molding composition exhibits a surface roughness of class 3 or class 4,
  the molding composition is free of free of copolymers comprising ethylene and (meth)acrylate co-monomers, and
  the molding composition is free of a sterically hindered phenol.

17. A thermoplastic molding composition comprising

A) from 10 to 94% by weight of a polyamide,

B) from 10 to 25% by weight of an impact modifier selected from the group consisting of
a copolymer I of
  $B_1$) from 35 to 89.9% by weight of ethylene
  $B_2$) from 10 to 60% by weight of 1-octene or 1-butene or propylene or a mixture of these and
  $B_3$) from 0.05 to 5% by weight of functional monomers, where the functional monomers are selected from the group consisting of the carboxylic acid groups, carboxylic anhydride groups, carboxylic ester groups, carboxamide groups, carboximide groups, amino groups, hydroxy groups, epoxy groups, urethane groups, oxazoline groups, and mixtures thereof, a copolymer II of
  $B_1$) from 50 to 98% by weight of ethylene
  $B_4$) from 2 to 50% by weight of acrylic acid or methacrylic acid, and
  $B_5$) optionally from 0 to 20% by weight of functional monomers selected from the group consisting of carboxylic anhydride groups, epoxy groups, and mixtures thereof, or a mixture of copolymer I and copolymer II, C) from 0.1 to 10% by weight of a copolymer of
  $C_1$) from 50 to 95% by weight of styrene or substituted styrenes of the general formula I or a mixture of these

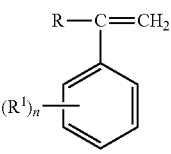

in which R is an alkyl radical having from 1 to 8 carbon atoms or a hydrogen atom and $R^1$ is an alkyl radical having from 1 to 8 carbon atoms and n has the value 0, 1, 2, or 3, and
  $C_2$) from 5 to 50% by weight of structural units derived from one or more dicarboxylic anhydrides, D) from 0.001 to 20% by weight of iron powder wherein the C content of component D) is from 0.01 to 1.2 g/100 g when measured by a method based on ASTM E1019, E) from 1 to 3% by weight of a copper-containing stabilizer, F) from 100 ppm to 5% by weight of alkali metal salts or alkaline earth metal salts of oxo acids of phosphorus or a mixture of these, G) from 0 to 2% by weight of a polyethyleneimine homo- or copolymer, H) from 0 to 60% by weight of further additives selected from the group consisting of a fibrous filler, a particulate filler, a lubricant, a nigrosin, oxidation retarders, UV stabilizers, dyes, pigments, nucleating agents, heat stabilizers, flame retardants, mold release agents, and plasticizers, wherein:
  the total of the percentages by weight of A) to H) is 100%,
  the molding composition exhibits a surface roughness of class 3 or class 4,
  the molding composition is free of free of copolymers comprising ethylene and (meth)acrylate co-monomers, and
  the molding composition is free of a sterically hindered phenol.

18. The thermoplastic molding composition according to claim 1, wherein the iron powder as component D) has a $d_{50}$ in a range from 1.6 µm to 8 µm.

19. The thermoplastic molding composition according to claim 1, wherein the thermoplastic molding composition consists of components A) to H).

* * * * *